United States Patent
Raether et al.

(10) Patent No.: US 6,364,921 B1
(45) Date of Patent: Apr. 2, 2002

(54) AIR FILTER ASSEMBLY FOR FILTERING AIR HAVING PARTICULATE MATTER

(75) Inventors: Thomas D. Raether, St. Louis Park; Steven A. Johnson, St. Paul; Kristofer G. Kosmider, Bloomington, all of MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 09/607,257

(22) Filed: Jun. 30, 2000

(51) Int. Cl.[7] ............................................. B01D 46/04
(52) U.S. Cl. .................... 55/302; 55/341.1; 55/324; 55/379; 95/280
(58) Field of Search ........................... 55/302, 301, 337, 55/368, 372, 373, 379, 380, 459.1, 341.1, 341.2, 319, 324; 95/280

(56) References Cited

U.S. PATENT DOCUMENTS

| | | | |
|---|---|---|---|
| 4,443,235 A | | 4/1984 | Brenholt et al. |
| 4,504,293 A | | 3/1985 | Gillingham et al. |
| 4,514,875 A | * | 5/1985 | Comer .......................... 55/302 |
| 4,521,231 A | * | 6/1985 | Shilling ........................ 55/302 |
| 4,820,320 A | * | 4/1989 | Cox .............................. 55/302 |
| 4,928,624 A | * | 5/1990 | Overton, Jr. .................. 55/302 |
| 4,953,308 A | * | 9/1990 | Basten et al. ................. 55/302 |
| B14,395,269 A | | 8/1994 | Schuler |
| 5,562,746 A | | 10/1996 | Raether |
| 5,593,471 A | * | 1/1997 | Hori et al. ..................... 55/302 |
| 5,730,766 A | * | 3/1998 | Clements ....................... 55/379 |
| 5,845,782 A | * | 12/1998 | Depew ........................... 55/302 |
| 6,015,443 A | * | 1/2000 | Mallory, Sr. .................. 55/302 |

* cited by examiner

*Primary Examiner*—David A. Simmons
*Assistant Examiner*—Minh-Chau T. Pham
(74) *Attorney, Agent, or Firm*—Merchant & Gould P.C.

(57) ABSTRACT

An air filter assembly for removing particulate matter from an incoming dirty air stream. The assembly includes a housing having an inlet, an outlet, a dirty air chamber and a clean air chamber and an elongated filter element arranged within the dirty air chamber constructed to remove particulate matter from an incoming air stream. The dirty air chamber has side walls, at least one of which is non-planar and has a distended portion. The distended side wall increases the volume within the dirty air chamber, thus providing for increased dirty air processing and/or decreased dirty air velocities.

20 Claims, 5 Drawing Sheets

AIR FILTER ASSEMBLY FOR FILTERING AIR HAVING PARTICULATE MATTER

FIELD OF THE DISCLOSURE

The present disclosure is related to air filtering systems having housings with non-planar side walls.

BACKGROUND OF THE DISCLOSURE

Many industries often encounter particulate matter suspended in the atmosphere. In some industries, this particulate matter is a valuable product, for example, starch; it would be beneficial if these suspended particulate could be recovered and reintroduced into the process. For other industries, such as metal or wood working, the particulate matter may be simply dust; it is desirable to remove dust particles from the air in order to provide a clear working environment.

Systems for cleaning an air or other gas stream laden with particulate matter include air filter assemblies that have filter elements disposed in a housing. The filter element may be a bag or sock of a suitable fabric or pleated paper. The gas stream, contaminated with particulate, typically is passed through the housing so that the particulate are captured and retained by the filter element. Cleaning is accomplished by periodically pulsing a brief jet of pressurized air into the interior of the filter element to reverse the air flow through the filter element, causing the collected contaminants to be collected . Such air filter assemblies are disclosed in, for example, U.S. Pat. No. 4,218,227 (Frey) and U.S. Pat. No. 4,395,269 (Schuler), which patents are hereby incorporated by reference.

Filter elements are usually used in an air filter assembly to process dust particles from an airstream. In a standard design of air filter assembly, an air filter assembly has a clean air chamber and a dirty air chamber. The two chambers are separated by a sheet metal, commonly referred to as a tube sheet. The tube sheet has a number of openings from which cylindrical filters are aligned. The filters suspend downwardly with or without an angle from the tube sheet openings into the dirty air chamber. Particulate-laden air is introduced into the dirty air chamber, and the particulates collect onto the filter. The filtered air passes through the filters to the interior of the filters, and upwardly out through the openings in the tube sheet into the clean air chamber. From the clean air chamber, the cleaned air is exhausted into the environment, or recirculated for other uses. For example, U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 5,207,812 (Tronto et al.), U.S. Pat. No. 4,954,255 (Muller et al.), U.S. Pat. No. 5,222,488 (Forsgren), and U.S. Pat. No. 5,211,846 (Kott et al.) are prior art examples of prior art cylindrical filter elements of the pleated cartridge type.

It has been found that in many conventional systems, an to attempt to operate these types of dust collectors at an increased airflow results in increased air velocities, which in turn results in a reduction of filter life. An increased airflow, for example, 8315 cubic feet per minute (cfm) or greater, leads to high cabinet air/dust velocity which results in the dust particulate abrading holes in the filter cartridges. The high cabinet air/dust velocity may also inhibit the drop-out of the dust particles into the collection hopper. This results in the filters being plugged and a loss in total dust collection airflow.

SUMMARY OF THE DISCLOSURE

The construction and arrangement of the disclosed air filter assembly helps to overcome the problems of the prior art. In particular, in one embodiment, the structure and arrangement of the assembly of the present disclosure enables the processing of at least 10% more dust laden air, typically at least 20% more dust laden airflow compared to conventional systems. In preferred systems, the assembly of the present disclosure results in a dust laden airflow increase greater than 10%, preferably at least 20%, and most preferably at least 25% without a significant change in the overall size of the filter housing apparatus or the number of filter cartridges required. The present design provides this increase by maintaining the amount of filtration media available for filtering the dirty air rather than increasing the amount of filtration media. Also, the structure and arrangement of the air filter assembly provides more efficient filter retention/sealing, filter housing apparatus manufacturing, and filter handling.

In another embodiment, the structure and arrangement of the assembly of the present disclosure results in an air velocity that is at least 10%, preferably at least 20%, and most preferably at least 25% less than the air velocity of a similar volume of air being filtered by a conventional air filtration assembly.

In particular, the present disclosure is directed to an air filter assembly having distended side wall, in particular, an air filter assembly comprising a housing including an air inlet that provides a dirty air volume to the assembly, an air outlet, and a spacer wall separating the housing into a filtering chamber and a clean air chamber. The housing comprises a plurality of side walls forming the filtering chamber, at least one of the side walls is a non-straight wall, having a first wall portion and a second wall portion. By the term "non-straight", it is meant that the wall is non-planar; that is, the first and second wall portions are positioned with an angle therebetween. A filter construction is positioned in air flow communication with an air flow aperture in the spacer wall, the filter construction including an extension of filter media defining a filter construction inner clean air chamber. In some embodiments, a third wall portion is included.

In a preferred embodiment, the housing of the air filter assembly has two opposite facing walls, each side wall having a distended portion formed by the first wall portion and the second wall portion.

The filter construction or filter element used in the air filter assembly having the distended side panel of the present disclosure may be any conventional filter construction. A non-cylindrical filter construction, for example, an oval or elliptical filter construction, is one preferred element. In particular, it is preferred that a non-cylindrical filter construction is positioned in the air filter assembly so that a long axis of a cross-sectional area of the filter is parallel to the direction of the incoming dirty air stream.

BRIEF DESCRIPTION OF THE DRAWINGS

FIG. 3 is a front elevation view of the air filtration system depicted in FIG. 2;

FIG. 4 is a perspective view of a portion of a mounting arrangement utilized in the air filtration system of FIGS. 1–3;

DETAILED DESCRIPTION OF THE PREFERRED EMBODIMENT

Figure 1:
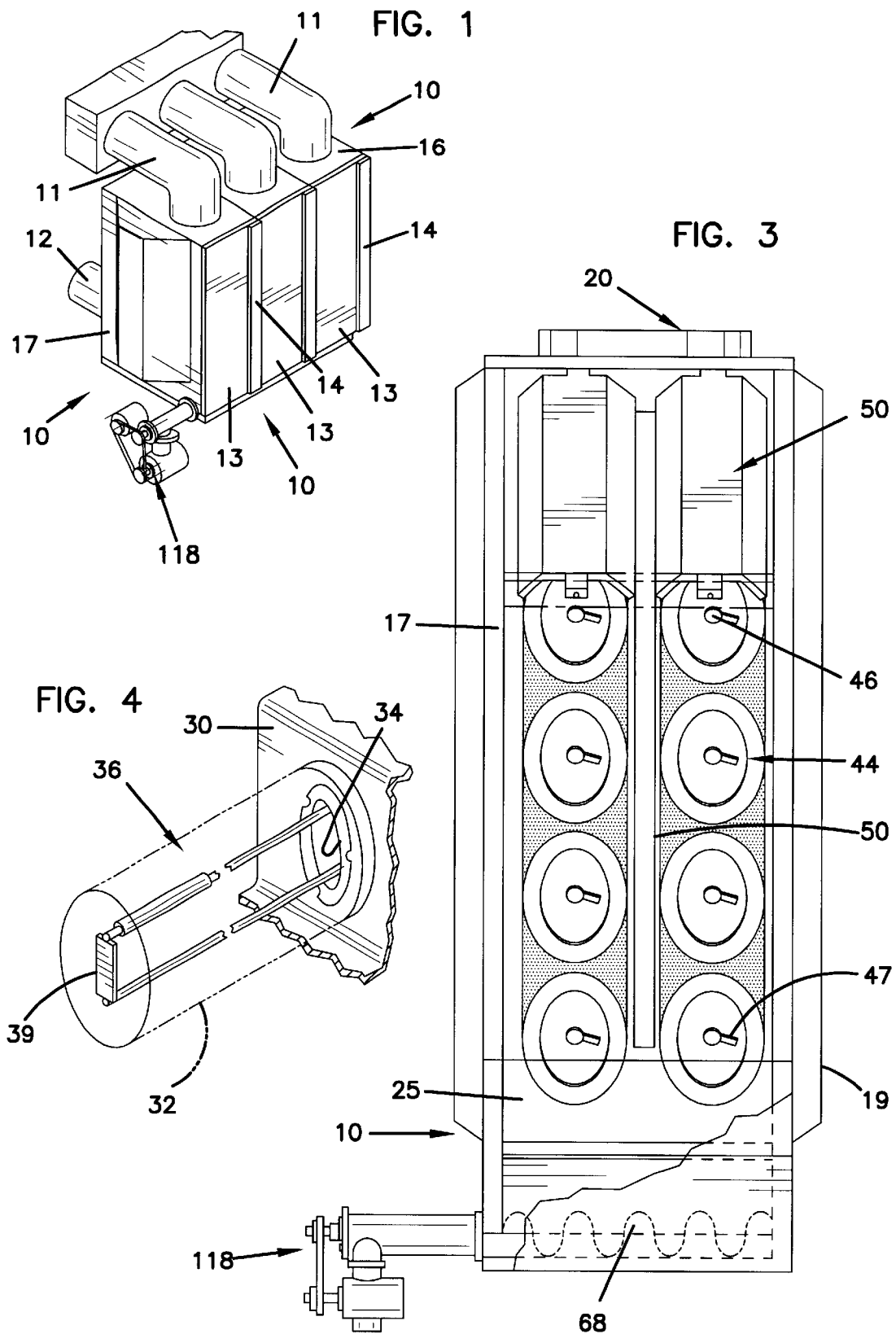
FIG. 1 is a perspective view of one type of operational installation of an air filtration system having non-cylindrical filter elements according to the present disclosure.

Referring to FIG. 1, an air filtration system or assembly is depicted generally at 10. The system 10 depicted is shown with three units or modules configured together in side-by-side arrangement. This arrangement can be, for example, of a size that fits into a 2 meter by 3 meter by 3 meter space (approximately 6 feet by 10 feet by 10 feet).

Each module in FIG. 1 is generally in the shape of a box and includes an upper wall panel 16, and side wall panels 17. A front access door 13 and a secondary access door 14 permit access to the interior of each module for purposes of, for example, maintenance. Each module further includes a conduit 11 for receiving dirty or contaminated air (i.e., air with particulate matter therein) into the filter assembly. A like conduit 12 is provided for venting clean or filtered air from the filter assembly 10.

Also shown in FIG. 1 is a motor and chain drive assembly 118 of standard construction for operation of an auger screw in the base portion of the assembly. The auger is used to remove collected particulate from the interior of the air filtration assembly, as will be discussed in detail later.

Figure 2:
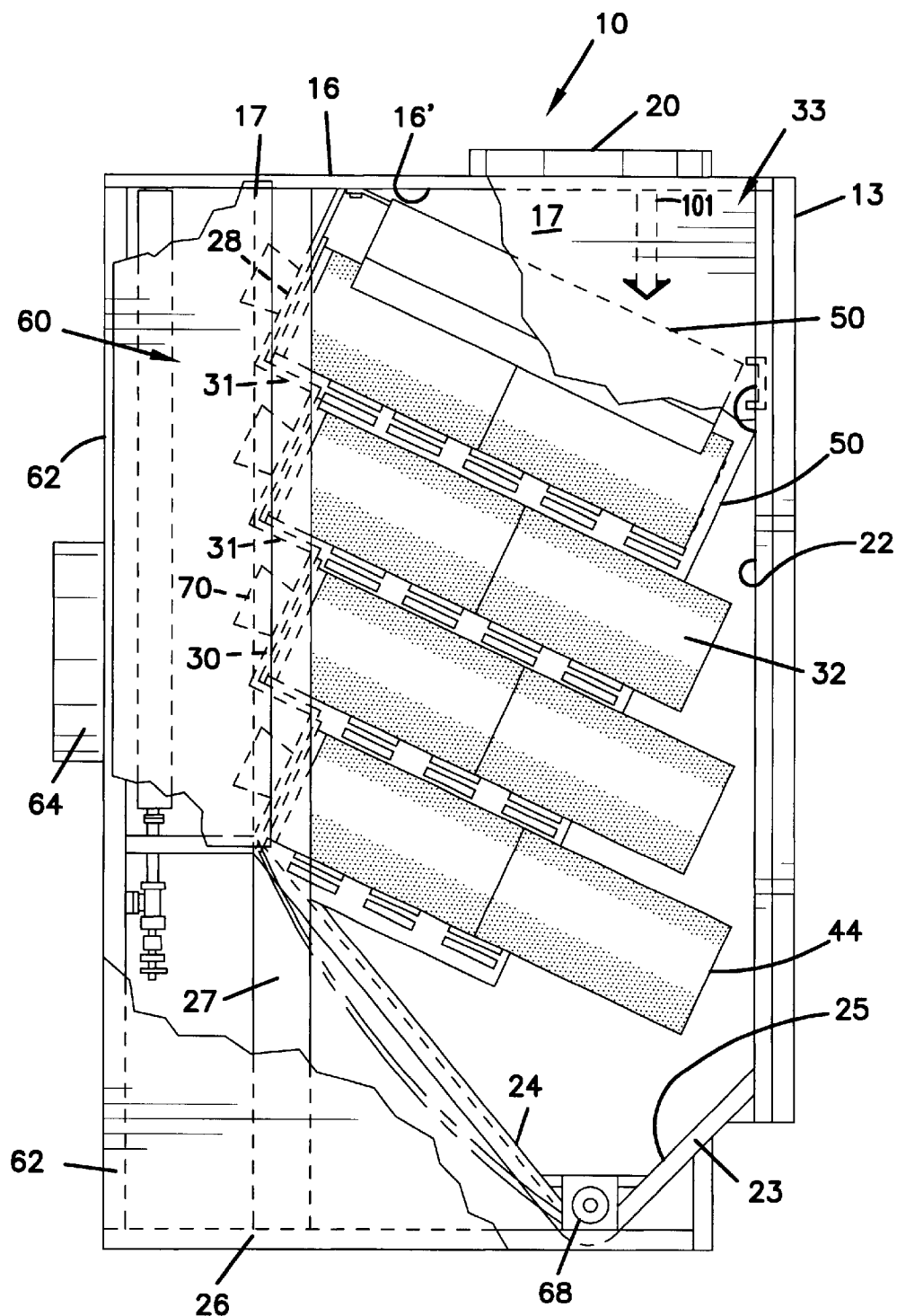
FIG. 2 is a side elevational view, partially broken away, of one embodiment of the air filtration system of FIG. 1 utilizing non-cylindrical filter elements.

Referring now to FIG. 2, the present disclosure is shown in side elevation with one side wall panel 17 being broken away to facilitate description of the arrangement of the various elements of the assembly. In this embodiment, the upper wall panel 16 has an inner wall surface 16' with an air inlet 20 positioned in the upper wall panel 16 so that entering dust-laden air or other contaminated gas is introduced in a downwardly direction (referred to as air flow direction 101) into a dirty air chamber 22. A typical volume of incoming dirty air is about 500 cubic feet per minute (cfm) for one conventional cylindrical filter element; in accordance with the present disclosure, a typical volume of incoming dirty air may be at least about 550 cfm, preferably at least about 600 cfm, and more preferably at least about 625 cfm. In many industries where air filter assemblies of this type are installed, the amount of dust or other particulate contaminant in the dirty air stream is about one grain (0.0648 gram) of particulate per each cubic foot of air. Filtered, or "clean air" has less than about 0.001 grain particulate per each cubic foot of air.

The top inlet 20 allows the assembly to utilize the forces of gravity in moving the dust through the assembly 10 to the collection area. The dirty air chamber 22 is defined by the door 13, the upper wall panel 16, two pairs of opposing side wall panels 17 which extend downwardly from the upper panel 16, tube sheet structure 28 (shown in phantom in FIG. 2), and a pair of sloping wall surfaces 23, 24. Sloping wall surfaces 23, 24 partially define a collection area or hopper 25 within the base portion of the assembly. The dirty air chamber 22 is a sealed chamber in order to prevent any escape of contaminated air or fluid prior to its being filtered. A bottom base panel or frame 26 is sealed to the side wall panels 17 in any suitable, standard manner. A bottom base panel or frame 26 is sealed to the side wall panels 17 in any suitable, standard manner. The volume of dirty air chamber 22 is generally less than about 176 cubic feet, and is typically about 73 and 121 cubic feet. Common volumes include about 97 cubic feet.

Figure 5A:
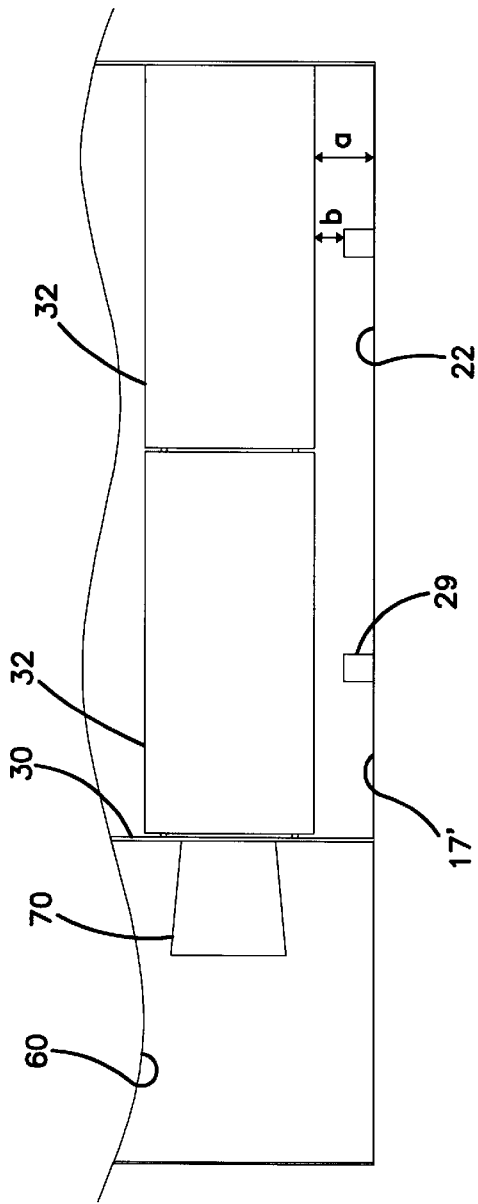
FIG. 5A is a top view of a portion of an air filtration system showing a conventional arrangement of a side panel used in conventional air filtration systems.

Side panel 17 is the structure which encloses and encases dirty air chamber 22. Side panel 17 is typically made of, for example, metal or plastic. In a conventional air filtration system, such as shown in FIG. 5A, the side panels are planar sheets or walls. When viewed from the exterior of the air filtration system 10, the side panels 17' are two dimensional, i.e., planar or flat. The interior of side panels 17' may include a single stiffener 29 or multiple stiffeners 29, such as rails, bars, and the like, which strengthen the side panels 17'. These stiffeners 29 are preferred because the strength inherent in planar side panels 17' themselves is typically ineffective at securely resisting the large volumes of dirty air that pass through dirty air chamber 22. Typically, such stiffeners are placed internally and extend vertically from upper wall panel 16 to bottom panel 26 (not shown in FIG. 5A), although horizontal stiffeners may be used in some embodiments.

Still referring to FIG. 5A, in one typical conventional air assembly, the distance "a" between filter element 32 and side panel 17' is approximately 10.4 cm (4.1 inches) and the distance "b" between stiffener 29 and filter element 32 is approximately 5.3 cm (2.1 inches).

Figure 5B:
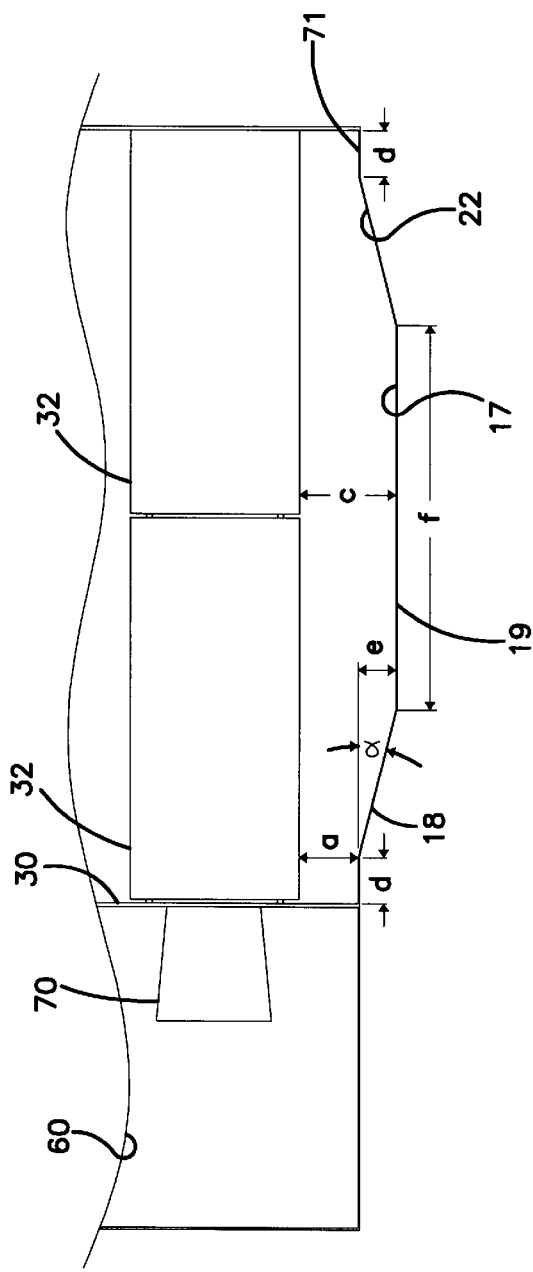
FIG. 5B is a top view of a portion of an air filtration system showing a side panel for use in the air filtration system of the present disclosure.

FIG. 5B, one embodiment of the present disclosure, shows stiffeners 29 and planar side panel 17' removed and replaced with expanded or distended side panel 17; distended side panel 17 is a non-straight side panel or wall. All side panels that form the housing may be designed as distended side panels, or in some instances it may be desired to have two opposite side panels as distended side panels. Side panel 17, in accordance with the present disclosure, is distended from filter elements 32 and includes sloped panel 18 and distended panel 19. Distended panel 19 is displaced a distance "e" out from where a planar side panel 17' (as shown in FIG. 5A) would be, thus providing a maximum distance between filter element 32 and side panel 17 of "c". Sloped panel 18 is placed at an angle "α" from where a planar side panel 17' would be. As seen in FIG. 5B, a portion of side panel 17 may remain parallel to filter element 32 and non-distended. Overall, distended side panel 17 increases the area through which the dirty air can flow down, thereby lowering the velocity of the air traveling past the filter elements 32 and providing for increased volumes of air. By utilizing a distended feature within side panel 17, stiffeners 29 as shown in FIG. 5A or other such features are not needed to strengthen side panel 17 because the shape produced by the angled panels 17 provides the desired stiffness.

Side panel 17, according to the present disclosure, includes various wall portions or sections, such as sloped panel 18 and distended panel 19, and may include a parallel wall portion 71. In a preferred embodiment, both parallel wall portion 71 and distended panel 19 are parallel to the extension of filtration media 35 that comprises filter element 32, and sloped panel 18 is positioned at an angle to each of wall portion 71 and distended panel 19. Typically, the angles between wall portion 71 and sloped panel 18, and distended panel 19 and sloped panel 18, are the same.

The distance "a", shown in FIG. 5B between filter element 32 and parallel wall portion 71, is at least about 5 cm, less than about 30 cm, typically about 5 to 20 cm, and in one example, about 10 cm, but is usually similar to the distance between side panel 17' and filter element 32 in the conventional embodiment shown in FIG. 5A. The distance "c", between filter element 32 and distended wall panel 19, is at least about 10 cm, less than about 50 cm, typically about 10 to 25 cm, and in one example about 17 cm. The length "d" of wall portion 71, if present, may be less than about 20 cm, typically less than about 10 cm, and in one example, about 8 cm. In some embodiments "d" may be 0 cm (zero). A wall portion 71 may be present on either end or both ends of side panel 17. The amount of distention of side panel 17 from wall portion 71, "e", is at least about 2 cm, less than about 20 cm, typically about 2 to 15 cm, and in one example about 6 cm. The distention is based on the angle "α" between wall portion 71 and sloped panel 18; this angle is generally greater than about 2 degrees, less than 90 degrees, and typically about 5 to 20 degrees. The actual distance between filter element 32 and various parts of side panel 17 will be largely dependent on the amount of space available for the entire air assembly unit 10. "F", the length of distended panel 19, is generally dependent on the total length of side panel 17, on the length of filter element(s) 32, and on the length of wall portion 71 and sloped portion 18. The length of "f" is generally less than about 150 cm, typically about 10 to 100 cm, and in one example about 65 cm. In some embodiments, no distended panel 19, having length "f" is present; rather, two sloped portions 18 meet, providing a triangular distended area.

The distances between filter element 32 and any portion of side wall 17 (for example, "a" between filter element 32 and wall portion 71, and "c" between filter element 32 and distended portion 19) should be measured so that a minimum distance measurement is achieved. For example, the measurement should be taken perpendicular to filter element 32, rather than at an angle, so that the shortest distance is measured.

In one embodiment, the distance "a" between filter element 32 and the end of side panel 17 is approximately 10.4 cm (4.1 inches), similar to that distance in the conventional embodiment shown in FIG. 5A. In a particular preferred embodiment utilizing the side panel 17 of the present disclosure, "a" is 10.4 cm (4.1 inches), "c" is 16.7 cm (6.6 inches), "d" is 8.6 cm (3.4 inches), "e" is 6.4 cm (2.5 inches), "f", the length of distended panel 19, is 66.0 cm (26.0 inches), and angle "α" is about 14.2 degrees. These dimensions are preferred for a filter element 32 having a maximum width (when measured perpendicular to its length) of about 38 cm (about 15 inches) and a length of 132.1 cm (52.0 inches). In another preferred embodiment, "a" is 11.0 cm (4.3 inches), "c" is 17.3 cm (6.8 inches), "d" is 8.6 cm (3.4 inches), and "e, "f", and angle "α" are the same. The filter element 32 may in fact be two stacked filter elements 32 each having a length of about 66 cm (about 26 inches).

The distended side panel provides for increased volume within the housing, and in particular within dirty air chamber 22, compared to a conventional housing without the distended side panel. An increased dirty air chamber volume allows for processing of increased volumes of dirty air, compared to dirty air chambers without the distended side panel; preferably the air filter assembly of the present disclosure, with a non-planar, distended side panel, provides for increases in air volume of at least 10%, preferably at least 20%, and most preferably at least 25%. The increased dirty air chamber volume also provides for decreased velocity of the dirty air as it circulates throughout dirty air chamber 22, compared to the velocity of dirty air in a conventional dirty air chamber. A slower air velocity prolongs the filter element life by decreasing the abrasion caused by the particulate contaminants impacting on the filter element. Preferably, by utilizing a non-planar, distended side panel according to the present disclosure, air velocity is decreased by at least 10%, preferably by at least 20%, and most preferably at least 25%.

The particular shape, size, and style of side panel 17 can be controlled by the space available for location of air filtration assembly 10. It is desired to minimize the floor space needed for assembly 10; however, it is preferable to increase the area of dirty air chamber 22. In some air filtration assembly designs, it may be desired to design side wall panel 17 to have a long, yet thin, distended panel 19 (i.e., long "f" and short "c"), or a short but thick panel 19 (i.e., short "f" and long "c"), or even multiple distended panels 19. In some instances it may be preferred to taper or slope the top or bottom portion of distended panel 19; see for example, FIG. 3. Distended panel 19 may or may not be centered within side panel 17, either vertically or horizontally. Further, distended panel 19, sloped panel 18, and other features of side panel 17 may vary along the height or width of side panel 17.

Sealed to a structural frame member 27 along each of the side wall panels 17 is mounted a spacer wall or tube sheet structure 28 to which are mounted the separate filter elements 32 of the assembly. The tube sheet structure 28 is sealed on all four of its sides to hermetically seal the dirty air chamber 22 from a clean air chamber 60. The volume of clean air chamber 60 is generally less than about 35 cubic feet, and is typically about 19 to 35 cubic feet. One common volume is 34.9 cubic feet. Together with the dirty air chamber 32, this provides a total chamber volume of about 92 to 211 cubic feet.

In the embodiment shown, spacer wall or tube sheet structure 28 has a step-like design, although it is understood that planar tube sheet structures, or structures having other geometries, can be used. The structure 28 in the shown embodiment has three steps or indented portions. Each step portion includes an upwardly extending back member 30 and a leg member 31 extending at right angles from the back member 30. The tube sheet structure 28 is preferably constructed from a single piece of sheet steel and thus, the individual step portions are continuous extensions of the step portion immediately above it and below it.

As shown in FIGS. 2 and 3, the filter elements 32 mounted to the structure 28 are positioned in the dirty air chamber 22 in stepped, partially overlapping relationship. The filter elements 32 may be positioned in a generally downward direction at an acute angle of inclination with respect to the horizontal plane of the upper surface panel 16. In this manner, a distribution space 33 is defined in the uppermost portion of the filter assembly 10 by an inclined baffle 50, the side wall panels 17, the upper wall panel inner surface 16', and front access door 13. The inclined baffle 50 is positioned to dissipate the incoming air flow throughout the dirty air chamber 22. As the dirty air enters the assembly 10 from the inlet 20, it is received into the distribution space 33 prior to its being filtered.

The individual filter elements 32 preferably are formed of pleated media, such as paper, formed into tube elements each having opposite ends. Each of these ends typically has an end cap thereon. Details of construction of the filter element 32 and how the filter media is fashioned into stable non-cylindrical shape and confined with end caps is disclosed in U.S. Pat. No. 4,171,963 (Schuler), which is incorporated herein by reference.

Figure 6:
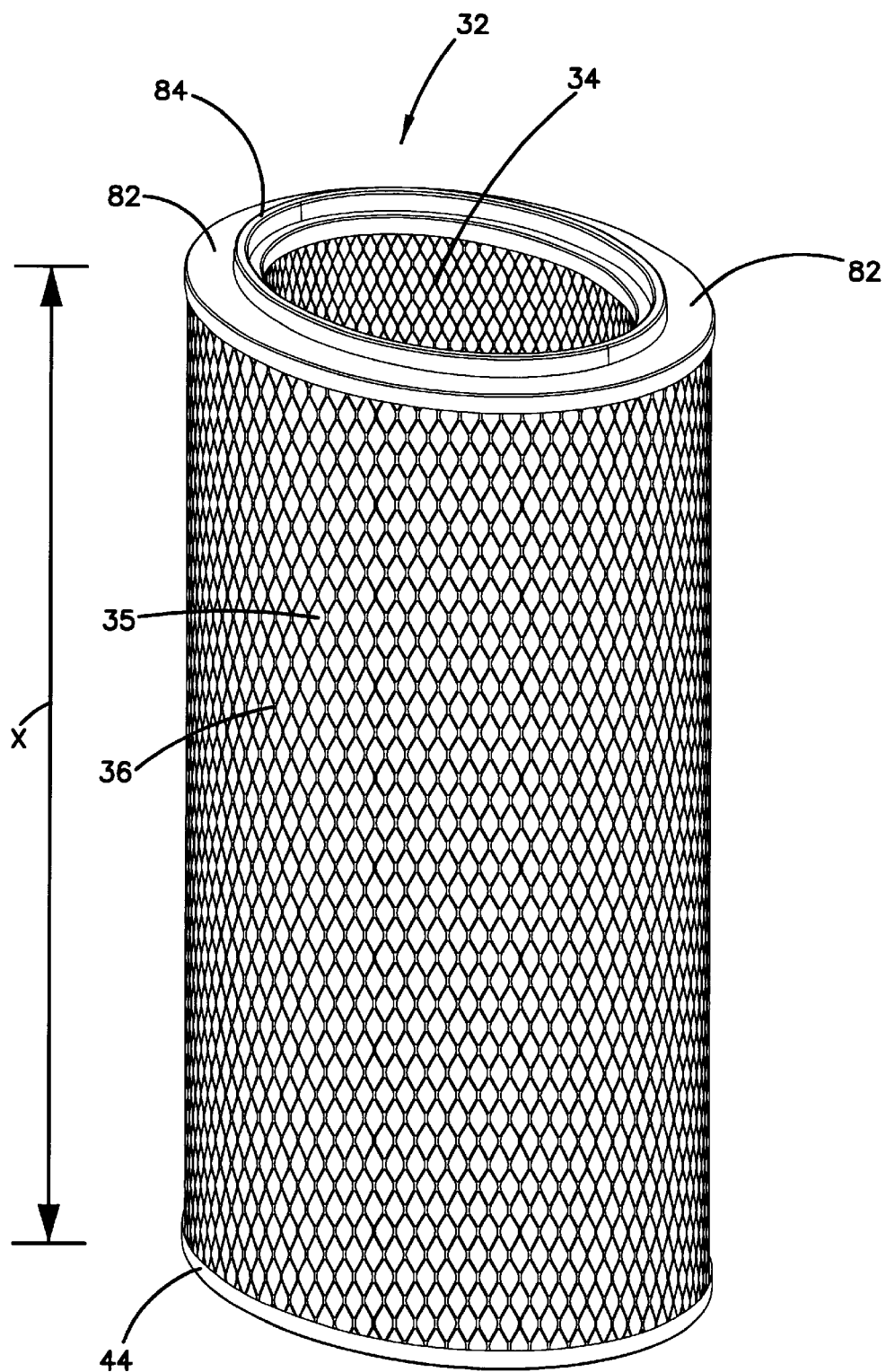
FIG. 6 is a side perspective view of an embodiment of a non-cylindrical element utilized in the air filtration system of the present disclosure.

A particularly preferred filter element for use with the distended side wall panel is shown in FIG. 6 as non-cylindrical filter element 32. Filter element 32 typically comprises a pleated filtration media 35 extending essentially the length of filter element 32 and an outer liner 36 that protects the filtration media 35 from physical damages.

Likewise, an inner liner 34 is positioned inside the filtration media 35 to protect and support filtration media 35. Additional details regarding non-cylindrical filter elements are disclosed in U.S. patent application having Ser. No. 09/608,774 filed on the same day herewith; the entire disclosure of which is incorporated herein by reference.

Each of the ends of the filtration media 35 is preferably potted or confined in an end cap (or collar member). A first end cap 82, referred to herein as the "proximal end", is an annular end cap and allows access to the interior of filter element 32. The opposite "distal end cap" 44 is a continuous cap that seals access to the interior of filtration media 35. The filtration media 35 and end caps 82, 44 define a filtered or clean air chamber (not shown). In some embodiments, such as when two filter elements 32 are stacked axially, distal end cap 44 of the first element 32 may be an annular cap, in order to allow air to flow freely between the internal chambers of the two stacked elements.

Generally, the portion of the media 35 covered by the end caps is not considered porous to air as it is shielded by the end cap. When mounted on structure 28 via yoke 36, proximal end cap 82 is positioned against structure 28. In some embodiments, a gasket may be disposed between the proximal end cap 82 and the structure 28. By pressing the filter element 32 toward the structure 28 and Compressing the gasket, an axially directed seal is provided between proximal end cap 82 and sheet structure 28 to prevent air leakage.

An example of how a filter element 32, cylindrical or non-cylindrical, may be supported to the sheet structure 28 is disclosed in U.S. Pat. No. 4,395,269 and 5,562,746. In particular, the support assembly for supporting the filter element is shown in FIG. 4. Back member portion 30 of the structure 28 has an opening (not shown) through which is disposed a Venturi element 70 (shown in phantom in FIG. 2). Venturi element 70 is positioned on the tube sheet structure 28 in relation to the filter element 32 such that the Venturi 70 is disposed in the clean air chamber 60. A yoke assembly 36, constructed to extended through the Venturi element 70 and into the center of filter element 32, is used for supporting the filter element 32. The yoke assembly 36 includes steel rods attached to (for example, by welding) and extending from the structure 28. Yoke assembly 36 is positioned to extend from structure 28 into the dirty air chamber 22. Alternatively, although not shown in the figures, steel rods of the yoke assembly can be threaded at the proximal end and extend through notches in the Venturi bell-mouthed-portion and apertures in the flange of the Venturi element 70. In such a case, a rod can be structured so that it can be secured to the tube sheet structure 28 together with the flange of the Venturi element 70 by a nut placed on the clean air chamber side of the tube sheet structure. This can be achieved in a variety of ways. For example, the rod can have an integral ridge proximate its proximal end to act a stop as the proximal end of the rod is extended through an aperture of the tube sheet structure 28 to be fastened with a nut. This arrangement has the advantage that no rod extends through the throat of the Venturi element 70. Another practicable alternative for securing the filter element to the tube sheet structure 28 is one similar to the arrangement disclosed in U.S. Pat. No. 4,218,227 (Frey).

In the embodiment shown in FIG. 4, each yoke assembly 36 is secured essentially perpendicular to the structure 28 so as to suspend the filter elements 32 at an acute angle with respect to horizontal. (Back member 30, on which yoke assembly 36 is positioned, is at an angle to horizontal). In some embodiments, however, back member 30 may be vertical, i.e., perpendicular to horizontal, and yoke assembly 36 is structured so that filter elements 32 are nevertheless positioned at an acute angle with respect to horizontal. The preferred range for the angle of inclination of the filter elements 32 is about 15°–30° from the horizontal, although the system can work with any angle of inclination, including no angle. In the embodiment shown in FIGS. 2 and 3, each back member 30 of the structure 28 has two horizontally spaced apart yoke assemblies 36 mounted thereon. Preferably, all of the filter elements 32 on structure 28 are parallel to one another.

FIG. 2 illustrates the placement of a pair of filter elements 32 onto each yoke assembly 36; two filter elements 32 are positioned axially in relation to one another. An annular distal end cap 44 having a centrally located opening is aligned with the end plate 39 so as to sealingly cover the outboard end of the second filter element of each pair. This allows the removable attachment of a clamping arrangement for axially compressing the gaskets (not shown in FIGS. 2–3) of the filter elements 32 to seal them to the tube sheet structure 28 as well as to each other. Also, a fastening bolt 46 with its special handle 47 is inserted through the aligned apertures of the end plate 39 and end cap 44 to secure the two together.

Directly behind the tube sheet structure 28 is the clean air chamber 60 which is defined by the back surface panel 62 of the assembly and a portion of the upper surface panel 16, a portion of the two opposing side panels 17, and the back side of the stepped tube sheet structure 28. Mounted in the back surface panel 62 is a clean air outlet 64 for venting the clean, filtered air into the conduit 12 for return to the plant environment.

Until the present disclosure, flat planar side panels have been used in air filter assemblies such as described herein. However, it has been found that in certain conventional systems, an to attempt to operate these types of dust collectors at an increased airflow results in increased air velocities, which in turn results in a reduction of filter life. An increased airflow, for example, 8315 cubic feet per minute (cfm) or greater, leads to high cabinet air/dust velocity which can abrade holes in the filter cartridges. The high cabinet air/dust velocity may also inhibit the drop-out of the dust particles into the collection hopper. This results in the filters being plugged and a loss in total dust collection airflow. The air filter assembly of the present disclosure overcomes these problems.

Figure 7:
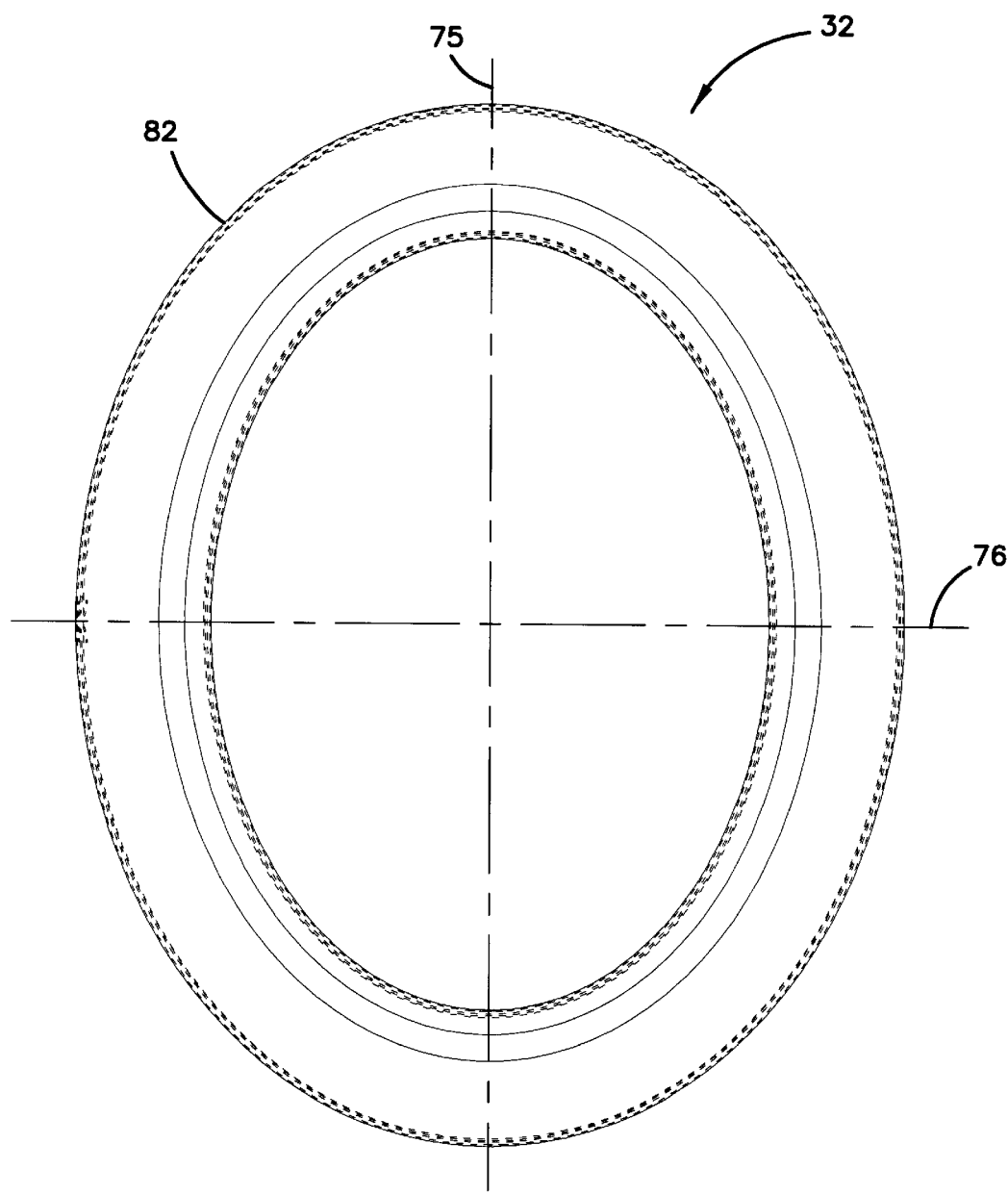
FIG. 7 is an enlarged end view of the non-cylindrical filter element shown in FIG. 6.

Referring now to FIGS. 6–7, one embodiment of a non-cylindrical filter element 32 will be explained in detail. It has been found that using non-cylindrical filter elements, in combination with the distended side panel of the present disclosure, further increases the air volume potential and decreases the air flow velocity.

Filter element 32 has a non-cylindrical sleeve of filtration media 35, preferably pleated, extending from proximal end cap 82 to a distal end cap 44. Typically, proximal end cap 82 is annular, providing for access to the clean air or filtered air chamber. In some embodiments, distal end cap 44 may be annular or may be continuous. In some embodiments, distal end cap 44 may be annular or may be continuous; in the context of this disclosure, an "annular end cap" is one where the end cap is ring-like and allows access to the interior of filtration media 35, and a "continuous end cap" is one that extends across the span of filtration media 35 and does not allow access to the interior of filtration media 35. Generally for two stacked filter elements 32, distal end cap 44 will be annular for the first of the stacked filter elements 32 and distal end 82 will be a continuous cap with a central aperture for passing a bolt therethrough for the second elements. A central aperture (minimal in size) may be included in a continuous end cap to allow passage of a bolt or other fastener therethrough so as to provide attachment of the filter element 32 to stepped tube sheet 28, however any aperture is tightly sealed by the fastener.

The length of filter element 32, shown as "x" in FIG. 6, generally taken from the outermost end of proximal end cap 82 to the outermost end of distal end cap 44 is at least about 45.7 cm (18 inches), less than about 122 cm (48 inches), typically about 55.9–76.2 cm (22–30 inches), often about 61.0–71.1 cm (24–28 inches), and preferably about 66.0 cm (26 inches), although longer and shorter filter elements could be used. Additionally, multiple filter elements 32, for example, two, three, or more filter elements 32, may be axially stacked to provide more filtration area.

Because filter element 32 is non-cylindrical, filtration media 35 and each end cap 82, 44 are also non-cylindrical; each end cap has a long axis 75 and a short axis 76, when taken perpendicular to the filtration media 35. FIG. 7 illustrates proximal end cap 82 with long axis 75 and short axis 76.

The aspect ratio, that is, the ratio between the short axis 76 of the end cap and the long axis 75 of the end cap, is typically at least about 0.5, less than 1.0, and is preferably about 0.7 to 0.9. In some systems, an aspect ratio of about 0.80 is preferred. In some systems, an aspect ratio of about 0.80 is preferred. It has been found that the lower the aspect ratio, the lower the air velocity as the air flows through the dirty air chamber 22 and around and through the filter elements 32. This results in less damage to the filter elements 32 and longer element life. Also, an aspect ratio of about 0.8 for a non-cylindrical filter element provides an increase of airflow by about 25% over that of a conventional cylindrical filter element, while keeping the cabinet velocities the same. However, as the aspect ratio for non-cylindrical filter elements decreases (i.e., the short axis 76 decreases in relation to the long axis 75), it becomes difficult to pulse clean air backwards through the elements 32 to loosen compacted particulates, due to the narrowness of the element through which the air pulse must travel.

The exterior dimension of end cap 82 (and end cap 44), when taken along the long axis 75, is at least about 15 cm, less than about 60 cm, typically is about 27.9–45.7 cm (11–18 inches), and preferably about 33.0–38.1 cm (13–15 inches). The interior dimension of end cap 82 (and optionally of end cap 44), when taken along the long axis 75, is at least about 5 cm, less than 55 cm, typically about 20.3–38.1 cm (8–15 inches), and preferably about 25.4–30.5 cm (10–12 inches). The exterior dimension of end cap 82 (and end cap 44), when taken along the short axis 76, is at least about 10 cm but less than about 55 cm, typically is about 20.3–38.1 cm (8–15 inches), preferably about 25.4–30.5 cm (10–12 inches). Generally, the interior dimension of the end cap 82 (and optionally of end cap 44), when taken along the short axis 76, is at least about 5 cm, less than about 50 cm, typically is about 12.7–30.5 cm (5–12 inches), and preferably about 17.8–22.9 cm (7–9 inches). The dimensions of the proximal end cap 82 and the distal end cap 44 will usually be the same; that is, typically the filter element 32 will not be tapered, but for some embodiments a taper may in fact be desired.

In a preferred embodiment of a non-cylindrical filter element 32, the exterior dimensions of both end caps 82, 44 are 37.70 cm (14.844 inches) along the long axis 75, and 30.08 cm (11.844 inches) along the short axis 76. If the end cap is annular, the interior dimensions of either end cap 82, 44 are 27.88 cm (10.976 inches) along the long axis 75, and 20.26 cm (7.976 inches) along the short axis 76. The length of the filter element 32 is preferably about 66.0 cm (26 inches). Thus, if two elements 32 were stacked, the overall length of the filter elements 32 would be 132.1 cm (52 inches). In another preferred embodiment, the exterior dimensions of either end cap 82, 44 are 36.47 cm (14.360 inches) along the long axis 75, and 28.85 cm (11.36 inches) along the short axis 76.

The air filter assembly of the present disclosure is designed to filter particulate from an incoming dirty air stream at a rate greater than conventional air filter assemblies that utilize cylindrical filter elements or constructions. One embodiment of the present disclosure provides a method of filtering dirty air to provide clean air. In particular, dirty incoming air, having a particulate contaminant concentration of at least 1 grain per cubic foot of air, is passed through an air filter assembly, preferably having non-cylindrical filter elements. The volume of incoming dirty air is at least 550 cubic feet per minute (cfm), preferably at least 600 cfm, and most preferably at least 625 cfm. The clean air exiting the air filter assembly has a contaminant concentration less than 0.001 grain per cubic foot.

Experimental

Computer modeling was run to compare the shape of side wall panels, i.e., internal verticals stiffeners versus a distended side panels. The modeling was done by using Computational Fluid Dynamics (CFD) software commercially available from Fluent, Inc. (of Lebanon, New Hampshire), which is a program commonly used for analyzing laminar and turbulent fluid flow problems. A Hewlett-Packard V-Class computer with 16 microprocessors was used to run the modeling.

CFD predicts flow through a volume (i.e., a domain) by using two equations: the continuity equation, $\rho_1 A_1 v_1 = \rho_2 A_2 v_2 =$ constant, where $\rho$ is the fluid density, A is the cross-sectional area, and v is the fluid velocity; and the momentum conservation equation, $\delta/\delta t \; (\rho u_i) + \delta/\delta x_j \; (\rho u_i u_j) = -\delta p/\delta x_i + \delta \tau_{ij}/\delta x_j + \rho g_i + F_i$, where p is the static pressure, u is the axial velocity, $d\tau_{ij}$ is the stress tensor (function of molecular velocity), $\rho g_i$ is the gravitational body force, and $F_i$ is the external body force. CFD also uses the standard k-$\epsilon$ model to predict flow through the domain. The standard k-$\epsilon$ model is a semi-empirical model based on model transport equations for the turbulent energy (k) and its dissipation rate ($\epsilon$). The model transport equation for k is derived from the exact equation, while the model transport equation for $\epsilon$ is obtained using physical reasoning. In the derivation of the k-$\epsilon$ model for the present system, it was assumed that the flow is fully turbulent, and the effects of molecular viscosity are negligible. Based on the above equations, velocity, pressure and turbulence at any point of domain, flow path, can be predicted.

The two models (i.e., distended side panels and planar side panels), were created using GAMBIT software package from Fluent, Inc. which is designed for building and meshing models for CFD. Each model utilized 16 non-cylindrical filter elements to form eight rows of filter element pairs; each model with 16 non-cylindrical filters used 1,457,024 Tet/Hybrid cells.

Both models were programmed with a Standard ABR (abrasion resistant) inlet with 18 inch diameter inlet duct and 37 inches by 20 inches rectangular outlet. After exporting models from GAMBIT to Fluent, the configuration in CFD was set as follows:

| Parameter | 16 Non-Cylindrical Filter Elements |
|---|---|
| Turbulence Model | k-epsilon (2 eqn) |
| Materials | Air |
| Inlet Velocity | 26.3 m/s |
| Outlet | Pressure Outlet |
| Filter | Porous-Zone |
| Filter's Viscous Resistance | 8.945e + 08 1/m$^2$ |
| Discretization | Pressure-Standard |
| | Momentum-2nd Order Upwind |
| | Pressure Vel. Coupling-SIMPLE |
| | Turb. Kinetic Energy-1st Order Upwind |
| | Turb. Dissipat. Rate-1st Order Upwind |
| Residual Monitors | Continuity = 0.0001 |
| | x-velocity = 0.001 |
| | y-velocity = 0.001 |
| | z-velocity = 0.001 |
| | k = 0.001 |
| | $\in$ = 0.001 |

The two models were created as described above. Both models used the non-cylindrical filter elements and an airflow of 9145 cfm. The distended side panel was dimensioned, as per FIG. 5B, with "a'" at 10.4 cm (4.1 inches), "c" at 16.7 cm (6.6 inches), "d" at 8.6 cm (3.4 inches), "e" at 6.4 cm (2.5 inches), "f", at 66.0 cm (26.0 inches), and angle "a" at 14.2 degrees.

The model showed that combination of the non-cylindrical filter elements within a housing having the distended side panel provided an air velocity of about 700 ft/minute, which was a reduction of approximately 30% when compared to non-cylindrical filters within a housing having vertical internal stiffeners.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts within the principles of the disclosure to the full extent indicated by the broad general meaning of the terms in which the appended claims are expressed.

We claim:

1. An air filter assembly comprising
   (a) a housing including an air inlet, an air outlet, a spacer wall separating the housing into a filtering chamber and a clean air chamber;
      (i) the housing comprising an upper panel, a base panel, a front panel, a back panel, and first and second opposite side walls forming the filtering chamber, at least one of the first and second side walls being a non-straight wall comprising: a first wall portion and a second wall portion with a first angle therebetween;
      (ii) the air inlet providing a dirty air volume to the air filter assembly, the dirty air volume having an air flow direction; and
   (b) a filter construction positioned in air flow communication with an air flow aperture in the spacer wall; the filter construction including an extension of filter media defining a filter construction inner clean air chamber; the filter construction extending into the filtering chamber.

2. The air filter assembly according to claim 1, wherein the angle is 5 to 20 degrees.

3. The air filter assembly according to claim 2, wherein the angle is about 14 degrees.

4. The air filter assembly according to claim 1, wherein the filter construction is a non-cylindrical filter construction.

5. The air filter assembly according to claim 4, wherein the non-cylindrical filter construction has a cross-sectional area when taken parallel to the first air flow aperture;
   (i) the non-cylindrical filter construction having a long axis perpendicular to a short axis within the cross-sectional area; and
   (ii) the non-cylindrical filter construction having a width along the long axis and a width along the short axis, the long axis width being greater than the short axis width, and the long axis positioned parallel to the air flow direction.

6. The air filter assembly according to claim 5, wherein the ratio of the long axis to the short axis is in the range of about 2:1 to 1.1:1.

7. The air filter assembly according to claim 5, wherein the ratio of the short axis to the long axis is about 0.8.

8. The air filter assembly according to claim 1 further comprising a second filter construction positioned in air flow communication with an air flow aperture in the spacer wall; the filter construction including an extension of filter media defining a filter construction inner clean air chamber; the filter construction extending into the filtering chamber.

9. The air filter assembly according to claim 8, wherein both the first and second side walls are non-straight walls comprising a first wall portion and a second wall portion with an angle therebetween, the filter construction and the second filter construction positioned parallel to one another between the first side wall and the second side wall.

10. The air filter assembly according to claim 1, wherein the non-straight wall further comprises a third wall portion, the second wall portion and the third wall portion having therebetween a second angle.

11. The air filter assembly according to claim 10, wherein:
   (i) the first wall portion is parallel to the extension of filter media;
   (ii) the second wall portion is positioned to the first wall portion at an angle of about 5 to 20 degrees; and
   (iii) the third wall portion is parallel to the extension of filter media.

12. The air filter assembly according to claim 13, wherein the angle is about 14 degrees.

13. The air filter assembly according to claim 11, further comprising a first minimum distance between the first wall portion and the extension of filter media and a second minimum distance between the third wall portion and the extension of filter media, the second minimum distance greater than the first greater distance.

14. The air filter assembly according to claim 13, wherein the first minimum distance is about 10 cm and the second minimum distance is about 17 cm.

15. The air filter assembly according to claim 13, wherein the first minimum distance is about 5 cm less than the second minimum distance.

16. An air filter assembly comprising
   (a) a housing including an air inlet, an air outlet, a spacer wall separating the housing into a filtering chamber and a clean air chamber;
      (i) the housing comprising an upper panel, a base panel, a front panel, a back panel, and first and second opposite side walls forming the filtering chamber, at least one of the first and second side walls being a non-straight wall comprising: a first wall portion, a second wall portion, a third wall portion, a fourth wall portion, and a fifth wall portion, a first angle between the first and the second wall portions, and between the fourth and fifth wall portions;

(ii) the air inlet providing a dirty air volume to the air filter assembly, the dirty air volume having an air flow direction; and (b) a filter construction positioned in air flow communication with an air flow aperture in the spacer wall; the filter construction including an extension of filter media defining a filter construction inner clean air chamber; the filter construction extending into the filtering chamber.

17. The air filter assembly according to claim 16, wherein the first angle is 5 to 20 degrees.

18. A method of cleaning air, comprising:

(a) inputting dirty air into a filter assembly, the filter assembly comprising:
  (i) a housing including an air inlet, an air outlet, a filtering chamber and a clean air chamber;
    (A) the housing comprising an upper panel, a base panel, a front panel, a back panel, and first and second opposite side walls forming the filtering chamber, at least one of the first and second side walls being a non-straight wall comprising: a first wall portion and a second wall portion with a first angle therebetween;
    (B) the air inlet providing a dirty air volume to the air filter assembly, the dirty air volume having an air flow direction; and (b) filtering the dirty air through a filter construction; the filter construction including an extension of filter media defining a filter construction inner clean air chamber; the filter construction extending into the filtering chamber; and (c) receiving clean air out from the clean air chamber of the filter assembly via the air outlet.

19. The method according to claim 18, wherein the step of inputting dirty air into a filter assembly comprises:

(a) inputting dirty air into the filter assembly with a portion of the dirty air volume passing by the non-straight wall.

20. The method according to claim 18, wherein the step of receiving clean air out from the clean air chamber comprises:

(a) receiving clean air out from the clean air chamber with a portion of the clean air passing by the non-straight wall.

* * * * *